United States Patent
Weyl et al.

(10) Patent No.: US 8,594,654 B2
(45) Date of Patent: Nov. 26, 2013

(54) SYSTEM FOR USING AT LEAST ONE MOBILE TERMINAL DEVICE IN A MOTOR VEHICLE

(75) Inventors: Daniel Weyl, Munich (DE); Karl-Ernst Steinberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1462 days.

(21) Appl. No.: 11/808,908

(22) Filed: Jun. 13, 2007

(65) Prior Publication Data

US 2007/0291664 A1 Dec. 20, 2007

Related U.S. Application Data

(63) Continuation of application No. PCT/EP2004/014217, filed on Dec. 14, 2007.

(51) Int. Cl.
*H04M 3/00* (2006.01)

(52) U.S. Cl.
USPC .......... 455/420; 455/3.06; 455/418; 455/419; 455/41.2; 455/569.1; 455/569.2; 701/1; 701/2; 701/202; 340/426.13; 340/426.14; 340/426.16; 340/426.2; 340/445; 340/539.1; 340/539.11; 340/539.19; 340/439

(58) Field of Classification Search
USPC .............. 455/41.2, 41.3, 99, 238.1, 297, 344, 455/345, 404.1, 404.2, 414.2, 418, 420, 455/456.1–457, 517, 556.1, 556.2, 557, 455/566, 569.2, 575.9, 3.06, 419, 569.1; 701/117–119, 200, 202, 206–209, 701/211–213, 1, 2; 340/932.2, 988, 990, 340/991, 995.1, 995.12, 995.13, 995.14, 340/995.15, 995.19, 995.2, 426.11–426.34, 340/425.5, 445, 539.1, 539.11, 539.19, 439
See application file for complete search history.

(56) References Cited

U.S. PATENT DOCUMENTS

| | | | | |
|---|---|---|---|---|
| 6,067,502 | A * | 5/2000 | Hayashida et al. | 701/209 |
| 6,622,083 | B1 * | 9/2003 | Knockeart et al. | 701/533 |
| 6,754,183 | B1 | 6/2004 | Razavi et al. | |
| 6,895,233 | B2 * | 5/2005 | Chen et al. | 455/345 |
| 7,006,793 | B2 * | 2/2006 | Himmel et al. | 455/41.1 |
| 2002/0133285 | A1 * | 9/2002 | Hirasago | 701/96 |
| 2003/0134660 | A1 | 7/2003 | Himmel et al. | |
| 2005/0190041 | A1 * | 9/2005 | Sahai | 340/5.72 |

FOREIGN PATENT DOCUMENTS

| WO | WO 00/74019 A1 | 12/2000 |
|---|---|---|
| WO | WO 00/77620 A2 | 12/2000 |

OTHER PUBLICATIONS

International Search Report dated Aug. 2, 2005 with an English translation of the pertinent portions (Four (4) pages).
Form PCT/IB/373 and Form PCT/ISA/237 including a partial English Translation of the pertinent portions (Ten (10) pages).

* cited by examiner

*Primary Examiner* — Olumide T Ajibade Akonai
(74) *Attorney, Agent, or Firm* — Crowell & Moring LLP

(57) ABSTRACT

A system for using at least one mobile terminal in a motor vehicle, such as a passenger automobile or a two-wheeled vehicle in particular, having at least one mobile terminal, a display device situated in the vehicle, an operating device provided in the vehicle, and a communication interface between the vehicle and the mobile terminal are provided. The mobile terminal and/or a terminal integration device provided in the vehicle be provided with a terminal sequence controller, which calls up an operating and/or display interface on the vehicle display device for operating functions and/or software applications of the mobile terminal and is operated via the vehicle operating device.

13 Claims, 1 Drawing Sheet

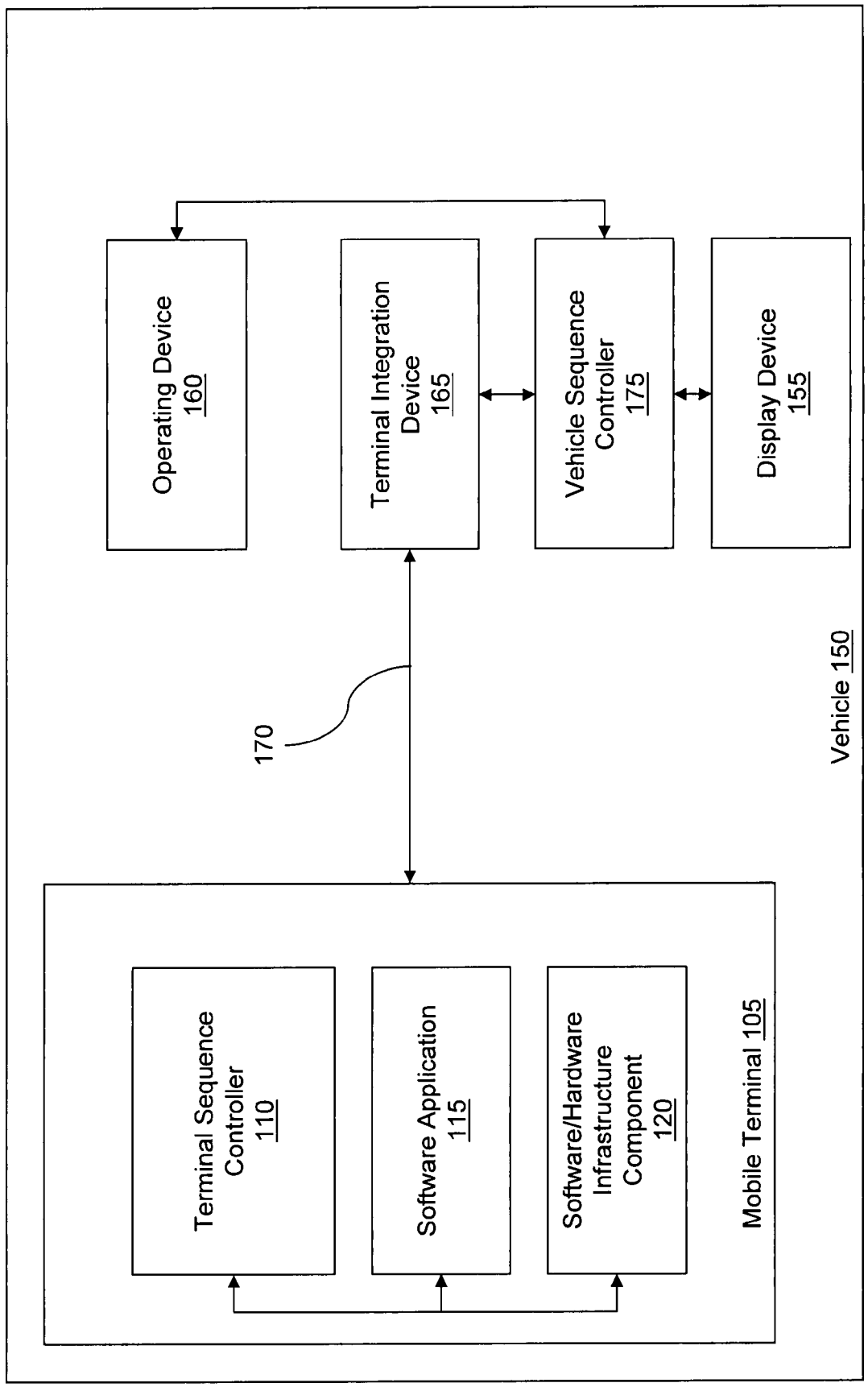

SYSTEM FOR USING AT LEAST ONE MOBILE TERMINAL DEVICE IN A MOTOR VEHICLE

CROSS REFERENCE TO RELATED APPLICATIONS

This application is a continuation of PCT International Application No. PCT/EP2004/014217, filed Dec. 14, 2004, the entire disclosure of which is herein expressly incorporated by reference.

BACKGROUND AND SUMMARY OF THE INVENTION

The present invention relates to a system for using at least one mobile terminal in a motor vehicle, such as a passenger automobile or a two-wheeled vehicle.

A mobile telephone can be used to communicate, via a short-range wireless Bluetooth system, with a vehicle and such that a telephone conversation can be performed using a hands-free facility of the vehicle. A so-called "mobile integration unit" of the vehicle accesses the telephone numbers of the mobile telephone and allows them to be displayed on a display of the vehicle. An operating device of the human-machine interface of the vehicle allows the numbers stored in the mobile telephone to be dialed. The menu design and the menu control on the display installed in the vehicle is determined by a sequence controller and/or program controller provided in the vehicle.

Exemplary embodiments of the present invention provide an improved system for using mobile terminals in a motor vehicle.

According to exemplary embodiments of the present invention, the mobile terminal and/or a terminal integration device provided in the vehicle is provided with a terminal sequence controller. The terminal sequence controller, in particular a program controller, cause the display of an operating and/or display interface on the vehicle display device, in particular a TFT display or a heads-up display, for operating functions and/or software applications or programs, which are provided by the mobile terminal. The applications or programs are can be applications installed or stored on the mobile terminal, which are provided by the mobile terminal even when the mobile terminal is used outside the vehicle and/or are applications installed or stored on the terminal which are provided in cooperation with devices of the motor vehicle via a corresponding communication coupling. According to exemplary embodiments of the present invention, the functions and/or applications are operated via the vehicle operating device, such as a push-turn actuator or the iDrive® controller of the applicant.

The system according to the present invention allows a driver to use the functions and/or applications of his mobile terminal in the vehicle via the display and the vehicle operating device. The operating and/or display interface or the menu design for operating and displaying in the vehicle is provided and/or instigated by the terminal sequence controller.

The hardware and/or software resources necessary for this purpose are entirely or partially provided in the system according to the present invention by the mobile terminal, and therefore have to be provided to only a small extent or not all by the vehicle. Because of the greatly varying development cycles of mobile terminals and vehicles, compatibility and/or reliability problems may thus be largely avoided. If the mobile terminal and/or the terminal integration device provided in the vehicle according to the present invention have the terminal sequence controller "matching" with the vehicle, the mobile terminal and its applications and functions may be used in the vehicle while employing the display and operating device of the vehicle.

BRIEF DESCRIPTION OF THE DRAWING FIGURES

The sole FIGURE is a block diagram of an exemplary system in accordance with the present invention.

DETAILED DESCRIPTION

The sole FIGURE is a block diagram of an exemplary system in accordance with the present invention. The system includes a mobile terminal 105 that is located within a motor vehicle 150. The motor vehicle includes a display device 155, an operating device 160 and a terminal integration device 165 that couples motor vehicle 150 and mobile terminal 105 via communication interface 170. Mobile terminal 105 includes a terminal sequence controller 110 arranged to call-up an operating and/or display interface on the display device 155 for operating functions and/or software applications of the mobile terminal 105 and is operated via the vehicle operating device 160.

Mobile terminal 105 can be, for example, a mobile telephone, a personal digital assistant (PDA), a notebook or other type of mobile computer, particularly a mobile entertainment device. Mobile terminal 105 can communicate with the terminal integration device 165 via an Internet protocol (IP protocol).

In accordance with the present invention, via the operating and/or display interface, a software application 115 provided on mobile terminal 105 is made usable in motor vehicle 150 via vehicle display device 155 and vehicle operating device 160, particularly for Internet browsing, entertainment, telephone, radio, TV, mobile office, messaging, navigation, games, and/or networking, particularly Bluetooth, WLAN, GPRS, and/or UMTS.

Alternatively or additionally, in accordance with the present invention, at least one software and/or hardware infrastructure component 120 of mobile terminal 105 is made usable via the vehicle display device 155 and the vehicle operating device 160, particularly a security or encryption component, a semiconductor memory, or the processor of the mobile terminal, for example.

Mobile terminal 105 allows communication between motor vehicle 150 and the "outside world." This can be used for rapid updating of the vehicle software by a corresponding data transmission from the producer of the vehicle into the relevant vehicle, for example, in the framework of a rapidly executable maintenance or repair measure (teleservice measure). A recall measure, for which the vehicle must be brought into the service station by the customer, is therefore no longer necessary in many cases.

Terminal sequence controller 110 can be designed in such a way that the operating and/or display interface called up on vehicle display device 155 is tailored, in relation to the corresponding operating interface of mobile terminal 105, to the situation in motor vehicle 150 in particular the driving situation. This operating and/or display interface can be more easily understandable and/or more easily operable for the driver.

Furthermore, terminal sequence controller 110 can be designed in such a way that it causes an adaptation of the operating interface to the driving situation in comparison to the operating and/or display interface of the mobile terminal 105. The adaptation may particularly comprise, according to the present invention, a selection and/or a compression and/or a more easily viewable design in relation to the operating and/or display interface of mobile terminal 105. To avoid information overload of the driver, for example, a distribution onto more operating and/or display menus or a distribution onto suitably divided menus may be performed by terminal sequence controller 110.

The menu design and/or menu control of the operating and/or display interface for operating functions and/or applications of the mobile terminal 105 can be speed-dependent in such a way that it is more easily understandable and/or more easily operable at a second speed of the vehicle which is higher than a first speed. This is achieved according to the present invention by terminal sequence controller 110. The ergonomics of operating and/or using mobile terminal 105 in motor vehicle 150 are additionally improved by this measure. In addition, the safety in street traffic is increased by reducing the distraction of the driver.

The selection and/or compression and/or more easily viewable design is oriented to the strain of the driver of the motor vehicle, which is achieved according to the present invention by terminal sequence controller 110. The strain of the driver is ascertained in particular on the basis of sensors on the vehicle and/or on the basis of traffic information transmitted into the vehicle, and the corresponding data is transmitted to the terminal sequence controller 110 for processing.

Motor vehicle 150 can also include vehicle sequence controller 175 that controls vehicle display device 155 and/or the control of the vehicle operating device 160 to call up another operating and/or display interface instead of the operating and/or display interface called up by the terminal sequence controller 110. This is performed, for example, if an important message of the vehicle electronics is to be brought to the attention of the driver. Furthermore, the operating and/or display interface may be changed by terminal sequence controller 110 according to the present invention if the status of the vehicle and/or the traffic situation changes, the change particularly being able to be used for warning the driver.

Vehicle sequence controller 175 allows the mobile terminal to at least partially assume a vehicle-specific function, such as a driver assistance system in particular, such as a parking aid or an image recognition system. Mobile terminal 150 can processes data which is provided by sensors attached to the vehicle.

If mobile terminal 105 provides software for navigation and/or route guiding, for example, the data which is provided by sensors attached to the vehicle may be used to improve the navigation and/or route guiding. For example, the data of the wheel sensors of the vehicle may improve the precision of the position detection of a vehicle in a tunnel, where the GPS signal may not be received. Multiple software applications can be included in mobile terminal 105, which may be "refined" by data which is provided by sensors attached to the vehicle.

With the advancing improvement over time of the mobile terminals, which is expressed in particular in an increase of their performance capability and communication capability, improved systems according to the present invention on the basis of higher-performance hardware and/or higher-performance software may be provided to the driver, such as improved driver assistance systems in particular. The disadvantageous binding to the vehicle electronics, which age relatively rapidly in relation thereto, may thus be largely remedied.

According to an exemplary embodiment of the present invention, the terminal sequence controller 110 includes a Java application. In this way, in particular, independence from the operating system of the vehicle 150 and/or the mobile terminal 150 and/or the type of the mobile terminal is achieved.

In one aspect of the present invention, the first menus, which are used for operating units of motor vehicle 150 and is to be represented on the display device 155 of motor vehicle 150, are generated by a data processing device provided in the vehicle. Second menus, which are used for operating the mobile terminal, are generated by the mobile terminal and/or the terminal integration device provided in the vehicle on the display and/or on the vehicle display device. This separation of the operation of units of the vehicle and the operation of the mobile terminal ensures that the vehicle may still be operated securely even in the event of a breakdown or failure of the mobile terminal. It is obvious that the transition may be flowing if this does not impair or even increases the security, and the transition is even also expedient for cost/utility reasons.

Terminal sequence controller 110, software application 115 and/or software/hardware infrastructure component 120 of mobile terminal 105 can be stored in a memory and loaded into a processor of mobile station 105.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system, comprising:
   a mobile terminal; and
   a motor vehicle, the motor vehicle comprising
      a display device;
      an operating device; and
      a communication interface that couples the motor vehicle and the mobile terminal,
   wherein the mobile terminal comprises a terminal sequence controller arranged to call-up an operating and/or display interface on the display device for operating functions and/or software applications of the mobile terminal and is operated via the operating device, and
   wherein a vehicle sequence controller provided in the motor vehicle takes over control of at least one of the display device and the operating device and calls up another operating and/or display interface instead of the operating and/or display interface called up by the terminal sequence controller to alert a driver to an important message of vehicle electronics.

2. The system according to claim 1, wherein the mobile terminal is a mobile telephone, a PDA or personal digital assistant, a notebook, or another mobile computer.

3. The system according to claim 1, wherein the mobile terminal communicates with a terminal integration device via an Internet protocol (IP protocol).

4. The system according to claim 1, wherein the mobile terminal further comprises a software application that is made useable, via the operating and/or display interface, for Internet browsing, entertainment, telephone, radio, TV, mobile office, messaging, navigation, games, and/or networking, such as Bluetooth, WLAN, GPRS, and/or UMTS.

5. The system according to claim 1, wherein the operating and/or display interface called up by the terminal sequence controller on the display device is adapted, in relation to a corresponding operating interface of the mobile terminal, to a speed of the motor vehicle, so that the operating and/or display interface is simplified when the speed of the motor vehicle exceeds a first speed.

6. The system according to claim 5, wherein the terminal sequence controller causes a selection and/or a compression and/or a simplified display in relation to the operating and/or display interface, including a distribution onto multiple menus, to adapt the operating interface to the speed of the motor vehicle.

7. The system according to claim 1, wherein the mobile terminal has a vehicle sequence controller that allows the mobile terminal to at least partially assume a vehicle-specific function, including a driver assistance system and cooperate with sensors attached to the motor vehicle.

8. The system according to claim 1, wherein the terminal sequence controller has a Java application, by which independence from the operating system and/or from the type of the terminal is achieved.

9. The system according to claim 1, wherein first menus, which are used to operate units of the motor vehicle and are shown on the display device of the motor vehicle, are generated by a data processing device provided in the motor vehicle, and second menus, which are used to operate the mobile terminal, are generated by the mobile terminal and/or a terminal integration device provided in the motor vehicle.

10. The system according to claim 7, wherein the driver assistance system includes a parking aid.

11. The system according to claim 7, wherein the driver assistance system includes an image recognition system.

12. A system, comprising:
a mobile terminal; and
a motor vehicle, the motor vehicle comprising
a display device;
an operating device; and
a communication interface that couples the motor vehicle and the mobile terminal,
wherein the mobile terminal comprises a terminal sequence controller arranged to call-up an operating and/or display interface on the display device for operating functions and/or software applications of the mobile terminal and is operated via the operating device,
wherein the operating and/or display interface called up by the terminal sequence controller on the display device is adapted, in relation to a corresponding operating interface of the mobile terminal, to a speed of the motor vehicle, so that the operating and/or display interface is simplified when the speed of the motor vehicle exceeds a first speed,
wherein the terminal sequence controller causes a selection and/or a compression and/or a simplified display in relation to the operating and/or display interface, including a distribution onto multiple menus, to adapt the operating interface to the speed of the motor vehicle.

13. A system, comprising:
a mobile terminal; and
a motor vehicle, the motor vehicle comprising
a display device;
an operating device; and
a communication interface that couples the motor vehicle and the mobile terminal,
wherein the mobile terminal comprises a terminal sequence controller arranged to call-up an operating and/or display interface on the display device for operating functions and/or software applications of the mobile terminal and is operated via the operating device,
wherein the operating and/or display interface called up by the terminal sequence controller on the display device is adapted, in relation to a corresponding operating interface of the mobile terminal, to a speed of the motor vehicle, so that the operating and/or display interface is simplified when the speed of the motor vehicle exceeds a first speed,
wherein the terminal sequence controller causes a selection and/or a compression and/or a simplified display in relation to the operating and/or display interface, including a distribution onto multiple menus, to adapt the operating interface to the speed of the motor vehicle, and
wherein the selection and/or the compression and/or the simplified display is based on an information load on a driver of the motor vehicle, which is ascertained on the basis of sensors on the motor vehicle and/or on the basis of traffic information transmitted into the motor vehicle.

* * * * *